United States Patent [19]
Coe et al.

[11] 3,835,211
[45] Sept. 10, 1974

[54] SILICON NITRIDE PRODUCTS

[75] Inventors: Roger Frank Coe; Roland John Lumby, both of Birmingham, England

[73] Assignee: Joseph Lucas (Industries) Limited, Birmingham, England

[22] Filed: Apr. 6, 1972

[21] Appl. No.: 241,750

Related U.S. Application Data

[63] Continuation-in-part of Ser. No. 868,237, Oct. 21, 1969, abandoned.

[30] Foreign Application Priority Data
Dec. 11, 1968 Great Britain.................. 58885/68

[52] U.S. Cl..................... 264/66, 264/332, 423/344
[51] Int. Cl. ..................... C04b 35/58, C01b 21/06
[58] Field of Search ............... 423/344; 264/66, 332

[56] References Cited
UNITED STATES PATENTS
3,409,417  11/1968  Yates........................... 264/332 UX FOREIGN PATENTS OR APPLICATIONS
1,092,637  11/1967  Great Britain..................... 423/344

Primary Examiner—M. Weissman
Attorney, Agent, or Firm—Holman & Stern

[57] ABSTRACT

A method of manufacturing silicon nitride products is of the kind in which silicon nitride powder is pressed at an elevated temperature to form the product, the pressing being continued until the product is fully densified. The method is characterised in that the fully densified product is then heated further at a temperature sufficient to convert $\alpha$-phase silicon nitride to $\beta$-phase silicon nitride.

4 Claims, 1 Drawing Figure

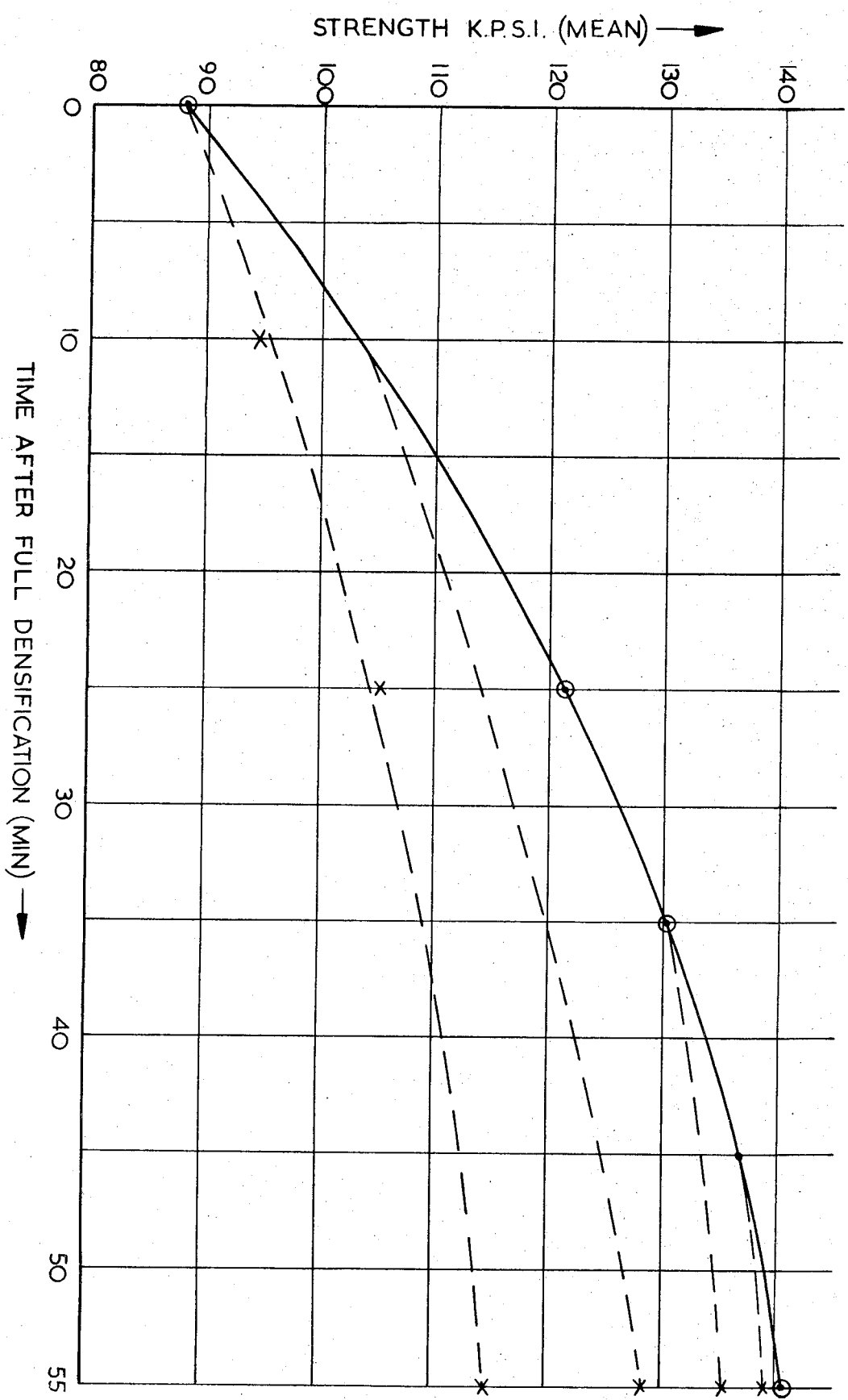

SILICON NITRIDE PRODUCTS

This invention relates to silicon nitride products and is a continuation-in-part application of our co-pending application Ser. No. 868,237, filed Oct. 21, 1969, now abandoned.

It is known to manufacture silicon nitride products by pressing silicon nitride powder at an elevated temperature, the pressing being continued until the product is fully densified. The expression "fully densified" is well-known in the art and refers to the state in which the product has been pressed sufficiently to acquire its maximum density, so that further pressure does not change the dimensions or density of the product. The expression "fully densified" is used herein in this well-known sense. Of course, it will be appreciated that in manufacturing a silicon nitride product, the total amount of silicon nitride powder which is used is calculated bearing in mind the change in dimensions which will occur during the pressing operation.

It is also known, following discoveries made by one of the co-inventors of the instant application, that silicon nitride products exhibiting highly desirable strength properties can be obtained by hot pressing silicon nitride powder which is substantially entirely in its α-phase. It was found that during hot pressing of such a powder, the α-phase silicon nitride was converted to β-phase silicon nitride and it was believed that this conversion contributed significantly to the production of high strength silicon nitride products. In this prior art method, however, hot pressing of the α-phase silicon nitride powder ceased when the powder reached full densification.

The present invention is based on the discovery that if a silicon nitride product formed by hot pressing silicon nitride powder, such as the α-phase powder used in the prior art method described in the preceeding paragraph, is maintained at an elevated temperature after the product is fully densified, its strength increases considerably. The explanation for this increase in strength is thought to be that when silicon nitride powder is pressed to full densification, although most of the silicon nitride has been converted to the β-phase, there is still a proportion of the silicon nitride in the α-phase. The continued heating, which may or may not be accompanied by pressure, converts the remaining α-phase material to its β-phase. Further, it is found that during heating beyond full densification, flaws existing in the micro structure of the fully densified product are reduced in magnitude and this, together with the α to β conversion of the silicon nitride, is thought to be a contributing feature to the improvement in strength of the hot pressed components produced by the method of the invention.

The additional heating can be carried out in the die which is used to compact and sinter the silicon nitride. In such a case, the invention resides in a method of manufacturing a silicon nitride product comprising pressing silicon nitride powder in a die at an elevated temperature to form a fully densified product, and retaining the fully densified product in the die at a temperature sufficient to convert α-phase silicon nitride to β-phase silicon nitride for a period of at least 10 minutes. The figure of 10 minutes is a purely artificial figure, and is inserted to distinguish the method of the invention from possible accidental anticipation by performing a conventional hot pressing method, and not stopping the heating process immediately upon full densification.

Although the heating beyond full densification can be carried out in the same die, the product can be removed from the die and placed in a separate furnace. In such a case, the invention resides in a method of manufacturing a silicon nitride product comprising pressing silicon nitride powder in a die at an elevated temperature to form a fully densified product, removing the fully densified product from the die and heating the product in a separate furnace at a temperature sufficient to cause α-phase silicon nitride to be converted to β-phase silicon nitride. In this method, there is of course no need to stipulate a time because there is no question of the invention being anticipated accidentally.

It will be appreciated from the above that the heating beyond full densification must be carried out at a temperature sufficiently high to convert the α-phase material to the β-phase material. Apart from this, however, the actual temperature used is not critical, although a preferred range would be between 1,500° and 1,850°C. Similarly the elevated temperature used in the hot pressing of the silicon nitride powder up to full densification is not critical, a preferred range for this temperature also being between 1,500° and 1,850°C. Still further, the pressure used to compress the silicon nitride powder into a fully densified product need not be closely controlled so that, as would be obvious to any expert in the field, pressures of between 1,000 p.s.i and 5,000 p.s.i. can be used advantageously.

As will be understood from the ensuing examples, the best results are obtained if the heating of the fully densified silicon nitride product is continued until all the α-phase material is converted to the β-phase material. However, advantages can be gained by converting only part of the α-phase material remaining in a fully densified product to the β-phase material.

EXAMPLE 1

Silicon nitride powder consisting approximately of 95% α-phase silicon nitride and 5% β-phase silicon nitride and having a mean particle size of 2 microns was first mixed with 2% by weight of magnesium oxide, also having a particle size of 2 microns. The mixture was then pressed at a temperature of 1,700°C and a pressure of 2,000 p.s.i. between graphite dies until the silicon nitride powder was fully densified. Tests made on the fully densified product showed that the modulus of rupture value of the product was 88,000 p.s.i.

The effect of retaining the fully densified product between the dies at the hot pressing temperature is shown in the single FIGURE of the accompanying drawings, wherein the strength of the product is plotted on a graph against the time of retaining the fully densified product between the dies. In the graph, the continuous line shows the increase in strength of the product when the product was retained between th dies at the pressure, as well as the temperature, of hot pressing. From the continuous line on the graph, it will be seen that after 25 minutes the strength of the product had increased to 121,600 p.s.i., whereas after 35 minutes and 55 minutes respectively the strength of the product had increased to values of 130,300 and 141,700 p.s.i. respectively.

The effect of removing the pressure on the product during various stages of the heating beyond full densification was also investigated and is shown in the dotted lines on the graph. From these lines, it will be seen that, although greater igprovements in the strength of the product are obtained when heating beyond full densification is accompanied by the application of pressure to the product, advantageous results are still obtained when the heating proceeds without the application of pressure.

EXAMPLE 2

Silicon nitride powder containing 1% of magnesium oxide and consisting of approximately 95% of $\alpha$-phase silicon nitride and 5% $\beta$-phase silicon nitride was pressed at 1,700°C between graphite dies until the product was fully densified. The product was then left between the dies under pressure and at the hot pressing temperature for 10 minutes. The product was found to have a modulus of rupture value of 88,000 p.s.i. Further products were made in exactly the same way but left after full densification for 25 minutes and 50 minutes respectively, and these products were found to have moduli of rupture values of 106,000 and 141,000 p.s.i. respectively.

We claim:

1. A method of manufacturing a silicon nitride product comprising pressing silicon nitride powder in a die at an elevated temperature to form a product which is fully densified at the pressure applied, and retaining the fully densified product in the die at a temperature sufficient to convert $\alpha$-phase silicon nitride to $\beta$-phase silicon nitride for a period of at least 10 minutes.

2. A method as claimed in claim 1 wherein said fully densified product remains under compression whilst the product is retained in the die at the temperature sufficient to convert $\alpha$-phase silicon nitride to $\beta$-phase silicon nitride.

3. A method of manufacturing a silicon nitride product comprising pressing silicon nitride powder in a die at an elevated temperature to form a product which is fully densified at the pressure applied, removing the fully densified product from the die, and heating the product in a separate furnace at a temperature sufficient to convert $\alpha$-phase silicon nitride to $\beta$-phase silicon nitride.

4. A method as claimed in claim 3 wherein said fully densified product is compressed whilst the product is heated in the separate furnace.

* * * * *